US008094658B2

(12) United States Patent
Pfeffer et al.

(10) Patent No.: US 8,094,658 B2
(45) Date of Patent: *Jan. 10, 2012

(54) SYSTEM AND METHOD FOR PROVIDING PREMIUM TRANSPORT IN A DOCSIS-COMPLIANT CABLE NETWORK

(75) Inventors: Howard Pfeffer, Reston, VA (US); Kenneth Gould, Oakton, VA (US); Ron Da Silva, Ashburn, VA (US)

(73) Assignee: Time Warner Cable, Inc., New York, NY (US)

( * ) Notice: Subject to any disclaimer, the term of this patent is extended or adjusted under 35 U.S.C. 154(b) by 805 days.

This patent is subject to a terminal disclaimer.

(21) Appl. No.: 12/113,575

(22) Filed: May 1, 2008

(65) Prior Publication Data

US 2008/0239993 A1    Oct. 2, 2008

Related U.S. Application Data

(63) Continuation of application No. 10/983,133, filed on Nov. 5, 2004, now Pat. No. 7,388,870.

(51) Int. Cl.
*H04L 12/28* (2006.01)
(52) U.S. Cl. ........ 370/392; 370/401; 370/252; 370/352; 725/111
(58) Field of Classification Search .................. None
See application file for complete search history.

(56) References Cited

U.S. PATENT DOCUMENTS

| | | | |
|---|---|---|---|
| 6,788,696 B2 * | 9/2004 | Allan et al. .................. 370/411 |
| 7,114,070 B1 | 9/2006 | Willming et al. | |
| 7,251,218 B2 | 7/2007 | Jorgensen | |
| 7,388,870 B2 * | 6/2008 | Pfeffer et al. .................. 370/401 |
| 7,423,975 B2 * | 9/2008 | Johnson et al. ................ 370/252 |
| 2002/0065907 A1 * | 5/2002 | Cloonan et al. ............... 709/223 |
| 2003/0185203 A1 * | 10/2003 | Chow et al. ................... 370/352 |
| 2004/0199667 A1 * | 10/2004 | Dobbins ........................ 709/240 |
| 2005/0015810 A1 * | 1/2005 | Gould et al. ................... 725/111 |
| 2005/0265376 A1 | 12/2005 | Chapman et al. | |
| 2005/0265398 A1 | 12/2005 | Chapman et al. | |
| 2006/0062209 A1 * | 3/2006 | Riley ............................ 370/352 |
| 2006/0077951 A1 | 4/2006 | Godas | |
| 2006/0182034 A1 * | 8/2006 | Klinker et al. ................ 370/238 |

OTHER PUBLICATIONS

Office Action, U.S. Appl. No. 10/983,133. U.S. Patent and Trademark Office, Jan. 11, 2008.
Amendment in Response to Office Action, U.S. Appl. No. 10/983,133, filed Jan. 31, 2008.
Notice of Allowance and Fees Due, U.S. Appl. No. 10/983,133, filed Apr. 9, 2008.

* cited by examiner

*Primary Examiner* — Duc C Ho
(74) *Attorney, Agent, or Firm* — The Marbury Law Group, PLLC

(57) ABSTRACT

A system and method for providing premium transport in a DOCSIS-compliant cable network. An edge server in a DOCSIS-compliant cable network maintains a list of preferred content providers (PCPs). For each PCP, the PCP list comprises matching criteria. The edge server monitors the header of incoming packets for the matching criteria. A packet that matches the matching criteria is modified by the edge server causing the packet to be associated with a "premium" downstream service flow. Packets sent in response to a "preferred" packet are parsed by a cable modem and routed upstream according to a "premium" upstream service flow.

42 Claims, 3 Drawing Sheets

SYSTEM AND METHOD FOR PROVIDING PREMIUM TRANSPORT IN A DOCSIS-COMPLIANT CABLE NETWORK

RELATIONSHIP TO OTHER APPLICATIONS

This application is a continuation of U.S. application Ser. No. 10/983,133, filed Nov. 5, 2004, now U.S. Pat. No. 7,388,870 which application is incorporated by reference for all purposes and from which priority is claimed.

BACKGROUND

Embodiments of the present invention are directed generally to packet transport in a cable network. More particularly, embodiments of the present invention are directed to systems and methods for transporting packets originating from preferred content providers over a cable network according to a selected "premium" service flow.

Hybrid Fiber Coax (HFC) cable networks were originally built to deliver broadcast-quality TV signals to homes. The wide availability of such systems and the extremely wide bandwidth of these systems led to the extension of their functionality to include delivery of high-speed broadband data signals to end-users. Data over Cable System Interface Specifications (DOCSIS), a protocol elaborated under the leadership of Cable Television Laboratories, Inc., has been established as the major industry standard for two-way communications over HFC cable plants.

The basic elements of a DOCSIS compliant cable network are the cable modem (CM), located on the subscriber's site, and the cable modem termination system (CMTS) and head-end located in facilities operated by the cable service provider. The medium between the CMTS and the different CMs is a two-way shared medium, in which the downstream channels carry signals from the head-end to users and upstream channels carry signals from users to head-end. A CM is normally tuned to one upstream channel and the associated downstream channel. The upstream channel is an inherently shared medium in which slots are reserved using a contention system while the downstream is a broadcast dedicated link from the CMTS to the CM.

A quality of service (QoS) level is defined for communications between a CM and a CMTS for each service to which a subscriber subscribes. For example, a basic data service subscriber may receive downstream traffic at a maximum burst rate of 3 Mbps, while a premium subscriber may receive downstream traffic at a maximum burst rate of 6 Mbps. Voice over IP (VoIP) services are typically provided with very stringent QoS requirements to assure that the quality of a cable-delivered telephone call will equal or exceed the call quality of a call placed over the public switched telephone network.

The principal mechanism for providing enhanced QoS is to classify packets traversing the path between a CM and CMTS into a service flow. A service flow is a unidirectional flow of packets that is provided a particular Quality of Service. The CM and CMTS provide this QoS by shaping, policing, and prioritizing traffic according to a QoS parameter set defined for the service flow.

Service flows exist in both the upstream and downstream direction, and may exist without actually being activated to carry traffic. Service flows have a 32-bit service flow identifier (SFID) assigned by the CMTS. All service flows have an SFID. An active and admitted upstream service flow also has a 14-bit Service Identifier (SID). At least two service flows are defined in a configuration file received by a CM—one for upstream and one for downstream service. The first upstream service flow describes the primary upstream service flow, and is the default service flow used for otherwise unclassified traffic. The first downstream service flow describes service to the primary downstream service flow. Additional service flows defined in the configuration file create service flows that are provided QoS services.

Conceptually, incoming packets are matched to a classifier that determines to which QoS service flow the packet is forwarded. The header of the packet is examined. If the packet matches one of the classifiers, it is forwarded to the service flow indicated by the SFID attribute of the classifier. If the packet is not matched to a classifier, it is forwarded on the primary service flow.

A classifier is a set of matching criteria applied to each packet entering the cable network. It comprises some packet matching criteria (destination IP address, for example), a classifier priority, and a reference to a service flow. If a packet matches the specified packet matching criteria, it is then delivered on the referenced service flow. Several classifiers may all refer to the same service flow. The classifier priority is used for ordering the application of classifiers to packets. Explicit ordering is necessary because the patterns used by classifiers may overlap. Downstream classifiers are applied by the CMTS to packets it is transmitting, and upstream classifiers are applied at the CM and may be applied at the CMTS to police the classification of upstream packets. The characteristics of a provisioned downstream service flow are defined in a DOCSIS configuration file downloaded by the CM when it boots and provided to the CMTS by the CM during registration.

Multiple service flows can be assigned per cable modem in either the upstream or downstream direction, and each of these service flows can correspond to a different QoS parameter set with different characteristics. This is conducive to allowing the CM to accommodate multiple kinds of data traffic at once, such as standard Internet traffic and Voice over IP (VoIP).

To guarantee bandwidth for a specific service, a network device must be able to identify packets associated with that service in all the IP traffic flowing through it. This identification and grouping process is called packet classification. Media gateways and MTAs use various match criteria to place traffic into a certain number of classes. Packet marking is the process of setting a Type of Service (ToS) bits or Differentiated Service Code Point (DSCP) bits in the IP header.

Modern IP enabled services such as voice over IP (VoIP) and MPEG Video over IP have a requirement for an assured rate of throughput, as well as strict requirements for latency and jitter, which could not be provided in a best effort environment. In addition, these kinds of services are not typically always active and, as such, resources to accommodate them need only be allocated when these services are required. For this reason, DOCSIS provides a range of modes for CM data transmission that can be initiated and terminated dynamically to accommodate these advanced IP services. Each of these modes can be applied to a QoS Parameter Set that defines characteristics of an upstream service flow:

Unsolicited Grant Service (UGS)—A service flow is created that allows a Cable Modem to transmit fixed size bursts of data at a guaranteed rate and with a guaranteed level of jitter by providing periodic transmission opportunities to the Cable Modem for fixed size frames. This kind of service flow is particularly suitable for Voice over IP applications.

Real-Time Polling Service (rtPS)—A service flow is created giving a periodic opportunity for a Cable Modem to request permission to transmit data by polling one Cable Modem for a bandwidth request, rather than all modems. This satisfies applications that have a requirement for real time data transmission as well as allowing the cable modem to transmit data bursts of varying length. This kind of service flow is particularly suitable for MPEG video over IP.

Unsolicited Grant Service with Activity Detection (UGS/AD)—This kind of service flow is a combination of UGS and rtPS and is useful for services that require a UGS style of fixed size and fixed rate transmission opportunities, but have significant periods where no data is being sent. One good example of this might be a Voice over IP phone call where up to 50% or more of the call may be silence and require no data transmission. While words are being spoken and packetized voice needs to be transmitted, the Cable Modem receives UGS style grants from the CMTS. When there is silence, the CMTS detects the absence of data and switches to an rtPS style mode, which temporarily frees up upstream bandwidth. When the conversation restarts and the Cable Modem needs to transmit more packetized voice, the Cable Modem transmits a further request to the CMTS via an rtPS granted opportunity and then the UGS style grants recommence.

Non-Real-Time Polling Service—This kind of service flow is like the rtPS, however polling will typically occur at a much lower rate and may not necessarily be periodic. This applies to applications that have no requirement for a real time service but may need an assured high level of bandwidth. An example of this may be a bulk data transfer or an Internet Gaming application.

A downstream service flow also uses QoS parameters to define particular downstream service flows. For example, QoS parameters used in the downstream direction comprise a "minimum reserved traffic rate," a "traffic priority," and a "maximum downstream latency." These downstream QoS parameters may be used by a scheduler in the CMTS to ensure that preferred traffic receives some guarantees for delivery within a certain amount of time and that that traffic is given priority over other traffic during times of downstream network congestion.

DOCSIS thus provides tools to define service flows both statically and dynamically in the upstream and downstream directions based on service type. However, there is no current mechanism for a cable system operator to redefine the parameter set of an upstream or downstream service flow based on the source of the packets being sent to, or from, a subscriber. What would be useful are systems and methods for transporting packets originating from designated content providers over a cable network according to a selected "premium" downstream service flow. These systems and methods would further provide the option of establishing a premium upstream service flow for packets sent by a subscriber in response to the downstream packets. Additionally, such systems and methods would provide the cable system operator means for billing the designated content provider for packets delivered using the premium service flow.

SUMMARY

In an embodiment of the present invention, an edge server maintains a list of preferred content providers (PCPs). For each PCP, the PCP list comprises matching criteria associated with a PCP. The PCP list can also be maintained by a centralized PCP list server that periodically pushes the PCP list to each of the edge servers or from which the edge servers periodically pull the lists.

The edge server monitors the header of incoming packets for the matching criteria. A packet that comprises the matching criteria is modified by the edge server. When the modified packet reaches the CMTS, the CMTS associates the packet with a "premium" downstream service flow having a "higher" QoS level ("premium transport"). Premium transport applies to the transport of packets over the path between the CMTS and a CM.

In an embodiment of the present invention, the matching criteria may comprise the packet source IP address, the packet source port, the packet protocol, and the destination port. However, this is not meant as a limitation. As will be apparent to those skilled in the art, other criteria may be used to match a packet to a listed PCP. For example, a packet may comprise a Multi-Protocol Label Switching (MPLS) tag that is used by the edge server to qualify a downstream packet for premium transport. For a particular PCP, the cable system operator establishes matching rules that require one or more of the matching criteria to be present in the received packet to qualify that packet for downstream premium transport.

In an embodiment of the present invention, modifying a packet to receive premium transport comprises replacing the ToS bits included in the IP header with a "premium" ToS value. This premium ToS value is maintained by each intermediate network hop between the edge router and the CMTS. The premium ToS value causes the CMTS to place the "preferred" packets onto a predefined "premium" service flow. Packets that do not contain the premium ToS bit values are placed on other service flows according to the ToS value as originally included in the packet header.

In another embodiment of the present invention, a packet from a customer premises equipment (CPE) is sent to the CMTS via the CM over a premium upstream service flow. During provisioning, the cable modem receives upstream classifiers that comprise parameters that define matching criteria enabling the CM to identify packets that are destined for PCPs. A packet that matches the matching criteria is associated with a CM-enforced policy that causes the packet to be directed to the PCP over a premium upstream service flow.

In yet another embodiment of the present invention, XML-formatted, Internet Protocol Detail Records (IPDR) are maintained by the edge routers or the CMTS. These records count the number of bits that have been delivered to the upstream and/or downstream premium service flows with content provider-identifiable information. The cable system operator uses the records to determine the traffic volume given premium transport for each PCP and may thus obtain compensation from the PCP accordingly. In an embodiment of the present invention, an identifying label or graphic can be placed on the PCP's web page indicating that this web content will be given preferential treatment by the cable network operator.

It is therefore an aspect of the present invention to transport packets originating from a PCP over a cable network according to a selected "premium" service flow.

It is another aspect of the present invention to monitor inbound packets at an edge server to determine whether the packets are entitled to transport via a premium service flow.

It is yet another aspect of the present invention to identify a packet entitled to transport via premium service flows and to replace a service classifier in the IP header with a premium service classifier indicative of a premium service flow.

It is still another aspect of the present invention to adapt the cable modem termination system (CMTS) to associate a premium service classifier with a premium service flow.

It is another aspect of the present invention to quantify the number of packets sent over a premium downstream service flow from a particular PCP.

It is yet another aspect of the present invention to identify packets originating from a CPE as entitled to transport via a premium upstream service flow.

It is still another aspect of the present invention to quantify the number of packets sent over a premium upstream service flow to a particular PCP.

These and other aspects of the present invention will be apparent from a review of the general and detailed description that follows.

In an embodiment of the present invention, a system for providing premium transport in a DOCSIS-compliant cable network comprises a preferred content provider (PCP) datastore and a packet discriminator. The PCP data store comprises PCP matching criteria. In an embodiment of the present invention, a PCP is a provider of content selected from the group consisting of games, web pages, video content, audio content, photographic content, news content, packet telephony service, and data content The packet discriminator is adapted to receive packets directed downstream to a subscriber on the DOCSIS-compliant network, extract packet identifying information from a packet IP header of a packet, and determine if the packet identifying information matches the PCP matching criteria. In an embodiment of the present invention, packet identifying information and PCP matching criteria comprise a source IP address. Optionally, packet identifying information and PCP matching criteria comprise a source IP address and a source port number. In another embodiment of the present invention, packet identifying information and PCP matching criteria comprise a source IP address and a type-of-service identifier.

If the packet identifying information matches the PCP matching criteria, then the packet discriminator modifies the packet IP header to receive a premium service classifier indicative of premium transport and routes the packet to the subscriber. In an embodiment of the present invention, the premium service classifier indicative of premium transport comprises premium type-of-service bits indicative of premium transport.

In another embodiment of the present invention, the system further comprises a cable modem termination system (CMTS). The CMTS is adapted to receive the packet routed to the subscriber and determine whether the packet IP header comprises the premium service classifier. If the packet IP header comprises the premium service classifier, then the CMTS selects a premium downstream service flow, and directs the packet to the subscriber using the selected premium downstream service flow. In an embodiment of the present invention, the premium downstream service flow comprises parameters indicative of a minimum reserved traffic rate, a traffic priority, and a maximum downstream latency.

In an embodiment of the present invention, the packet discriminator is located at the CMTS. In another embodiment of the present invention, the system further comprises an edge server and the packet discriminator is located at the edge server.

In yet another embodiment of the present invention, the system comprises a preferred packet statistics log. If the packet identifying information matches the PCP matching criteria, then the preferred packet statistics log receives the packet identifying information and billing information. In an embodiment of the present invention, the billing information comprises the premium service classifier, a packet destination IP address, and a date and time the packet was routed to the subscriber. In still another embodiment of the present invention, the PCP matching criteria are associated with a PCP identifier and the billing information further comprises the PCP identifier.

An embodiment of the present invention provides a method for providing premium transport in a DOCSIS-compliant cable network. According to this method, packets directed downstream to a subscriber on the DOCSIS-compliant network are received. Packet identifying information is extracted from a packet IP header of a packet. A determination is made whether the packet identifying information matches preferred content provider (PCP) matching criteria. If the packet identifying information matches the PCP matching criteria, then the packet IP header is modified to receive a premium service classifier indicative of premium transport, and the packet is routed to the subscriber.

In one embodiment of the present invention, packets are received at an edge server. In an alternate embodiment of the present invention, packets are received at a CMTS.

In an embodiment of the present invention, packet identifying information and PCP matching criteria comprise a source IP address. Optionally, packet identifying information and PCP matching criteria comprise a source IP address and a source port number. In another embodiment of the present invention, packet identifying information and PCP matching criteria comprise a source IP address and a type-of-service identifier.

Packets routed to the subscriber are received at a CMTS. A determination is made whether the packet IP header comprises the premium service classifier. If the packet IP header comprises the premium service classifier, then a downstream premium service flow is selected, and the packet is directed to the subscriber using the selected premium service flow. In an embodiment of the present invention, the premium downstream service flow comprises parameters indicative of a minimum reserved traffic rate, a traffic priority, and a maximum downstream latency.

In yet another embodiment of the present invention, if the packet identifying information matches the PCP matching criteria, then the packet identifying information and billing information are sent to a preferred packet statistics log. In an embodiment of the present invention, the billing information comprises the premium service classifier, a packet destination IP address, and a date and time the packet was routed to the subscriber. In another embodiment of the present invention, the PCP matching criteria are associated with a PCP identifier, and the billing information further comprises the PCP identifier.

In still another embodiment of the present invention, a PCP is a provider of content selected from the group consisting of games, web pages, video content, audio content, photographic content, news content, packet telephony service, and data content.

In an embodiment of the present invention, a system for providing premium transport in a DOCSIS-compliant cable network comprises a cable modem (CM), a customer premises equipment (CPE), and a cable modem termination system (CMTS). The CPE is connected to the CM, and the CM communicates with the CMTS over a hybrid fiber pathway. The CM is adapted to receive preferred content provider (PCP) matching criteria, to receive packets from the CPE, and to extract packet identifying information from a packet IP header of a packet. The CM determines if the packet identifying information matches the PCP matching criteria. If the packet identifying information matches the PCP matching criteria, then the CM directs the packet to the CMTS over a premium upstream service flow.

In an embodiment of the present invention, packet identifying criteria comprise a packet destination IP address and PCP matching criteria comprise a stored source IP address. Optionally, packet identifying information comprises a source IP address and a source port number. PCP matching criteria comprise a stored packet IP address and a stored packet port number. In another embodiment of the present invention, the packet identifying information further comprises a type-of-service identifier and the PCP matching criteria comprise a stored packet source IP address and a type of service identifier.

In an embodiment of the present invention, the premium upstream service flow comprises parameters indicative of a maximum upstream burst rate, a traffic priority, and a maximum upstream latency.

In yet another embodiment of the present invention, the system comprises a preferred packet statistics log. If the packet identifying information matches the PCP matching criteria, then the preferred packet statistics log receives the packet identifying information and billing information. In an embodiment of the present invention, the billing information comprises the premium service classifier, a packet destination IP address, and a date and time the packet was routed from the CM to the CMTS. In still another embodiment of the present invention, the PCP matching criteria are associated with a PCP identifier, and the billing information further comprises the PCP identifier.

In an embodiment of the present invention, a PCP is a provider of content selected from the group consisting of games, web pages, video content, audio content, photographic content, news content, packet telephony service, and data content.

An embodiment of the present invention provides a method for providing premium transport in a DOCSIS-compliant cable network. According to this method, a cable modem (CM) receives preferred content provider (PCP) matching criteria. Packets from a customer premises equipment (CPE) are received from the CM and packet identifying information extracted from a packet IP header. A determination is made whether the packet identifying information matches PCP matching criteria. If the packet identifying information matches the PCP matching criteria, then the packets are directed to the CMTS over a premium upstream service flow.

In an embodiment of the present invention, packet identifying criteria comprise a packet destination IP address and PCP matching criteria comprise a stored source IP address. Optionally, packet identifying information comprises a source IP address and a source port number and PCP matching criteria comprise a stored packet IP address and a stored packet port number. In another embodiment of the present invention, the packet identifying information further comprises a type-of-service identifier and the PCP matching criteria comprise a stored packet source IP address and a type of service identifier.

In an embodiment of the present invention, the premium upstream service flow comprises parameters indicative of a maximum upstream burst rate, a traffic priority, and a maximum upstream latency.

In yet another embodiment of the present invention, if the packet identifying information matches the PCP matching criteria, then the preferred packet statistics log receives the packet identifying information and billing information. In an embodiment of the present invention, the billing information comprises the premium service classifier, a packet destination IP address, and a date and time the packet was routed from the CM to the CMTS. In still another embodiment of the present invention, the PCP matching criteria are associated with a PCP identifier and the billing information further comprises the PCP identifier.

In an embodiment of the present invention, a PCP is a provider of content selected from the group consisting of games, web pages, video content, audio content, photographic content, news content, packet telephony service, and data content.

An embodiment of the present invention provides a method for providing premium transport to a preferred content provider over a DOCSIS-compliant cable network. According to this method, an agreement to provide premium transport to the preferred content provider (PCP) is made. Downstream packets are identified as originating from the PCP and are provided premium transport over the DOCSIS-compliant cable network. A measure indicative of premium transport usage by the PCP is stored. In an embodiment of the present invention, the measure indicative of premium transport usage by the PCP comprises packet volume. In another embodiment of the present invention, the measure indicative of premium transport usage by the PCP comprises a session time. The PCP is billed based on the premium transport usage.

According to this method, PCP matching criteria are established. Packets directed downstream to a subscriber on the DOCSIS-compliant network are received and packet identifying information extracted from an IP header of a packet. A determination is made whether the packet identifying information matches the PCP matching criteria. If the packet identifying information matches the PCP matching criteria, then the packet IP header is modified to receive a premium service classifier indicative of premium transport.

In one embodiment of the present invention, packets are received at an edge server. In an alternate embodiment of the present invention, packets are received at a CMTS.

In an embodiment of the present invention, packet identifying information and PCP matching criteria comprise a source IP address. Optionally, packet identifying information and PCP matching criteria comprise a source IP address and a source port number. In another embodiment of the present invention, packet identifying information and PCP matching criteria comprise a source IP address and a type-of-service identifier.

Packets routed to the subscriber are received at a CMTS. A determination is made whether the packet IP header comprises a premium service classifier. If the packet IP header comprises the premium service classifier, then a downstream premium service flow is selected, and the packet is directed to the subscriber using the selected premium service flow. In an embodiment of the present invention, the premium downstream service flow comprises parameters indicative of a minimum reserved traffic rate, a traffic priority, and a maximum downstream latency.

In still another embodiment of the present invention, a PCP is a provider of content selected from the group consisting of games, web pages, video content, audio content, photographic content, news content, packet telephony service, and data content.

DETAILED DESCRIPTION

The following terms are used in the description that follows. The definitions are provided for clarity of understanding:

| | |
|---|---|
| CM - | A cable modem. |
| CMTS - | A CM termination system. |
| CPE - | Customer premises equipment. |
| DSCP - | Differentiated service code. |
| DOCSIS - | "Data Over Cable Service Interface Specification" issued by Cable Television Laboratories, Inc. |
| DOCSIS Compliant Cable Network - | A cable network segment between a CMTS and a CM that complies with DOCSIS. |
| IPDR - | Internet protocol detail records. |
| IP - | Internet protocol. |
| IP address - | An address assigned to a device in accordance with the Internet protocol. |
| MAC address - | The media access controller address of a network device. |
| QoS - | Quality of service. |
| PCP - | Preferred content provider. |
| SFID - | Service flow identifier. |
| SID - | Service identifier. |
| ToS - | Type of service. |
| VoIP - | Voice over Internet Protocol. |

In an embodiment of the present invention, an edge server maintains a list of preferred content providers (PCPs). By way of illustration and not as a limitation, a PCP may provide content comprising games, web pages, video content, audio content, photographic content, news content, packet telephony service, and data content. For each PCP, the PCP list comprises matching criteria. The PCP can also be maintained by a centralized PCP list server that periodically pushes the PCP list to each of the edge servers or from which the edge servers periodically pull the lists.

The edge server monitors the header of an incoming packet for the matching criteria. A packet that comprises the matching criteria is modified by the edge server causing the packet to receive a higher downstream QoS of service level ("premium transport"). In an embodiment of the present invention, the matching criteria are selected from the packet source IP address, the packet source port, the packet protocol, and the destination port. However, this is not meant as a limitation. As will be apparent to those skilled in the art, other criteria may be used to match a packet to a listed PCP. For example, a packet may comprise a Multi-Protocol Label Switching (MPLS) tag that is used by the edge server to qualify a packet for premium transport. For a particular PCP, the cable system operator establishes matching rules that require one or more of the matching criteria to be present in the received packet to qualify that packet for premium transport.

Figure 1:
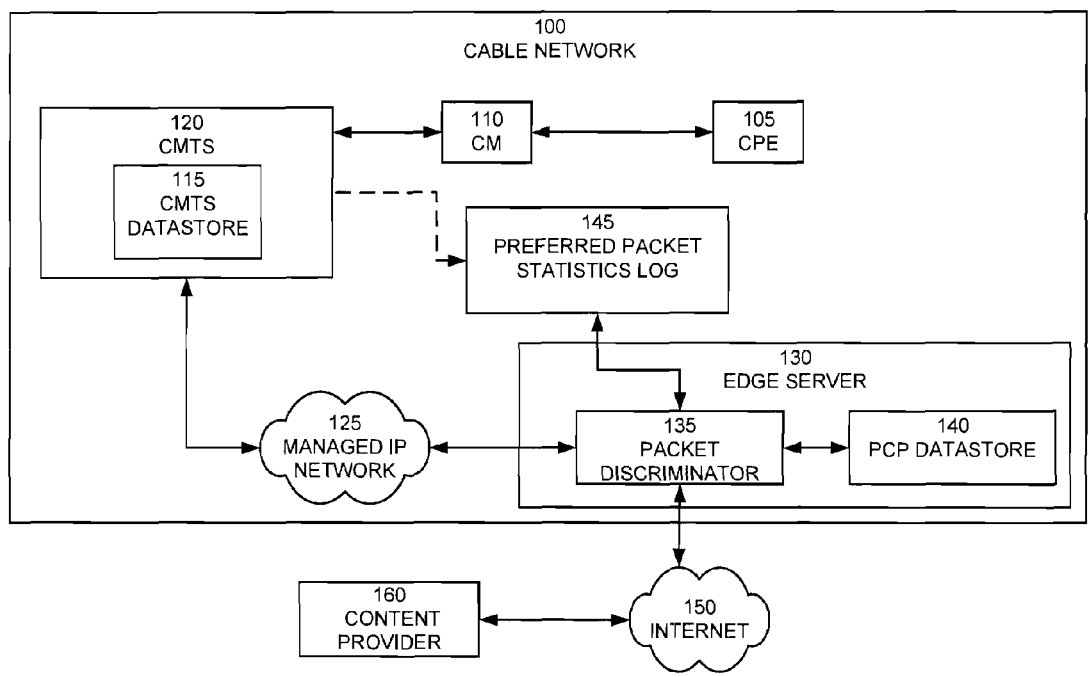
FIG. 1 illustrates a block diagram of a cable network adapted to provide premium transport services according to embodiments of the present invention.

FIG. 1 illustrates a block diagram of a cable network adapted to provide premium transport services according to embodiments of the present invention. Referring to FIG. 1, cable network 100 comprises a cable modem termination system (CMTS) 120, a managed IP network 125, and an edge server 130. CMTS 120 comprises a CMTS datastore 115 that maintains service flow definitions that are mapped to service classifiers. A cable modem 110 is connected to CMTS 120 and provides network connectivity to CPE 105.

The CMTS 120 connects to the Internet 150 via managed IP network 125 and edge server 130. Edge server 130 comprises packet discriminator 135 and preferred content provider (PCP) datastore 140. A content provider 160 directs packets to cable network 100 via the Internet 150 and edge server 130.

PCP datastore 140 comprises matching criteria used to identify packets originating from a PCP ("preferred packets") and a premium service classifier associated with packets identified as preferred. By way of illustration and not as a limitation, a preferred packet may be identified by its source IP address, originating port, destination port, and ToS bits. As will be appreciated by those skilled in the art, one or more of these criteria may be used to identify a packet as preferred. The premium service classifier represents an identifier that is mapped at the CMTS 120 to a premium service flow.

Packet discriminator 135 comprises logic for parsing the IP header of packets that are received by edge server 130, extracting identifying information of the sender of a packet, and applying matching criteria to determine whether the sender identifying information matches the matching criteria held in the PCP datastore 140. If the sender identifying information matches the matching criteria, packet discriminator 135 is further adapted to modify the packet in a manner that will identify it as packet entitled to "premium" transport. In an embodiment of the present invention, the packet is modified by replacing the ToS (or DSCP) bits in the header of the packet as received by the edge server with the premium service classifier associated with the PCP. If the sender identifying information does not match the matching criteria, packet discriminator 135 routes the received packet without modifying the packet.

CMTS 120 is adapted to direct packets to CM 110 in accordance with service flow definitions held in CMTS datastore 115 in accordance with the service classifier specified in the packet IP header. A "preferred" packet is directed to CM 110 in accordance with the "premium" service flow specified by the premium service classifier inserted by packet discriminator 135.

Cable network 100 further comprises preferred packet statistics log 145. As illustrated in FIG. 1, preferred packet statistics log collects preferred packet statistics from packet discriminator 135. By way of illustration and not as a limitation, preferred packet statistics comprise the packet identifying information and billing information. By way of illustration and not as a limitation, billing information comprises the service classifier inserted into the preferred packet header, the destination IP address, and the date and time the edge server forwarded the packet. In an embodiment of the present invention, the matching criteria in PCP datastore 140 is associated with a PCP identifier. The PCP identifier identifies the PCP associated with the matching criteria. In this embodiment, billing information further comprises the PCP identifier. In yet another embodiment of the present invention, the records within preferred packet statistics log 145 are in XML format. In an alternative embodiment of the present invention, the records within preferred packet statistics log 145 are in IPDR (Internet Protocol Detail Records) format.

In still another embodiment of the present invention, the preferred packet statistics log 145 receives preferred packet statistics from the CMTS 120 (as indicated by the dotted line in FIG. 1).

Figure 2:
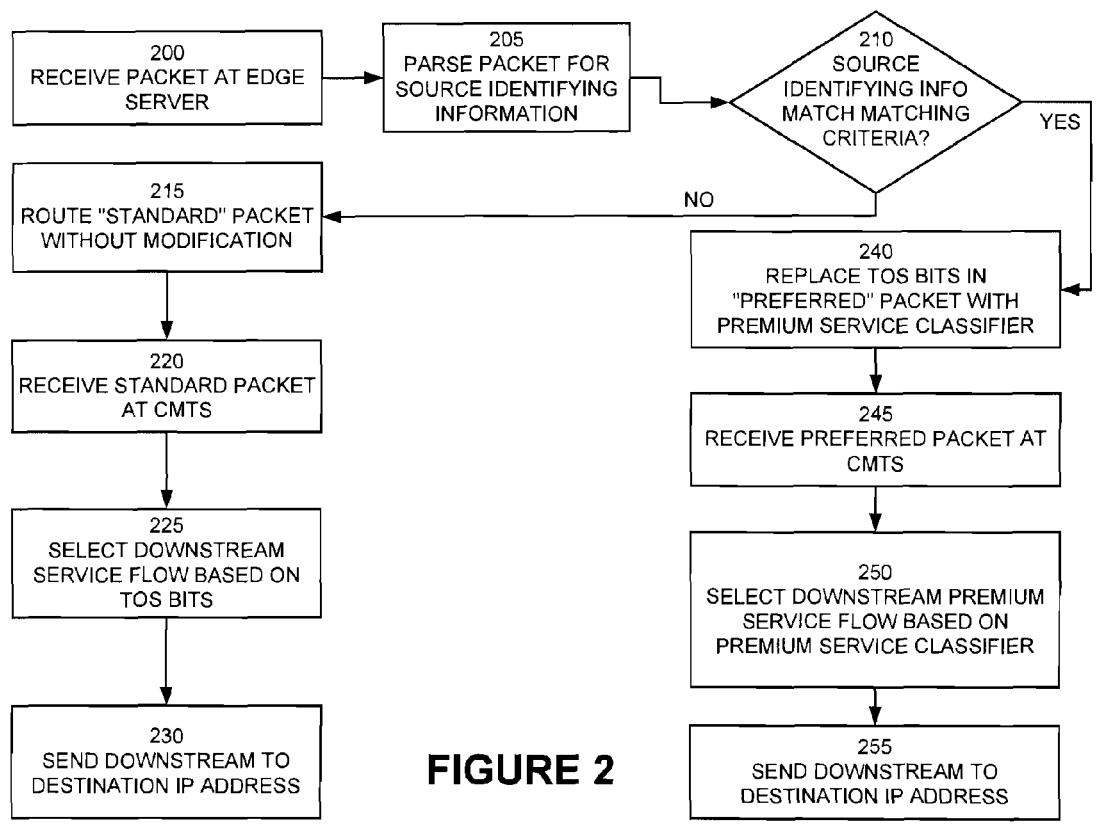
FIG. 2 illustrates a flow diagram of the process by which a packet is identified as a preferred packet and directed downstream using a premium service classifier according to embodiments of the present invention.

FIG. 2 illustrates a flow diagram of the process by which a packet is identified as a preferred packet and directed downstream using a premium service classifier according to embodiments of the present invention.

A packet is received at an edge server 200. The edge server parses the packet for source identifying information 205. The edge server then evaluates the source identifying information to determine whether it matches matching criteria 210. By way of illustration and not as a limitation, a preferred packet may be identified by its source IP address, originating port, destination port, and ToS bits. As will be appreciated by those skilled in the art, one or more of these criteria may be used to identify a packet as preferred.

If the source identifying information does not match the matching criteria, the "standard" packet is routed without modification 215. The standard packet is received at a CMTS 220 and a downstream service flow is selected based on the ToS bits in the packet header 225. The standard packet is then sent downstream to the destination IP address using the selected service flow 230.

If the source identifying information matches the matching criteria, the ToS bits in the "preferred" packet are replaced with a service classifier associated with the matching criteria 240. The preferred packet is received at a CMTS 245 and a "premium" downstream service flow is selected based on the service classifier inserted into the packet header 250. The preferred packet is then sent downstream to the destination IP address using the premium service flow 255.

In an embodiment of the present invention, packets sent in response to a preferred packet are identified as preferred upstream packets by a cable modem and are sent via a premium "upstream" service flow.

When a CM boots, it receives a boot or configuration file that comprises parameters that determine the way in which the CM performs on the cable network. Of relevance here is a QoS profile that affects the manner in which packets are sent and received by the CM. The QoS profile comprises the following information:
  Service class IDs
  Minimum traffic rate
  Maximum allowed traffic rate
  Traffic priority
  Grant sizes and intervals
  Jitter parameters
  Burst & Packet Sizes CMs also receive upstream classifiers that are used to identify the manner in which packets are transported in the upstream direction. In an embodiment of the present invention, during the provisioning process, a cable modem receives premium upstream classifier matching parameters that are stored in the CM. The premium upstream matching criteria are used to identify packets that are destined for a PCP and to direct those packets to the PCP using a premium service flow. By way of illustration and not as a limitation, premium matching criteria comprise source and destination addresses (and their associated masks), upper level protocol (e.g. TCP, UDP), source and destination port ranges, and ToS bits. A packet the matches the premium matching criteria is treated in a specified manner. For example, the ToS bits in the IP packet that was matched may be rewritten, then passed to the CMTS over a premium upstream service flow.

Figure 3:
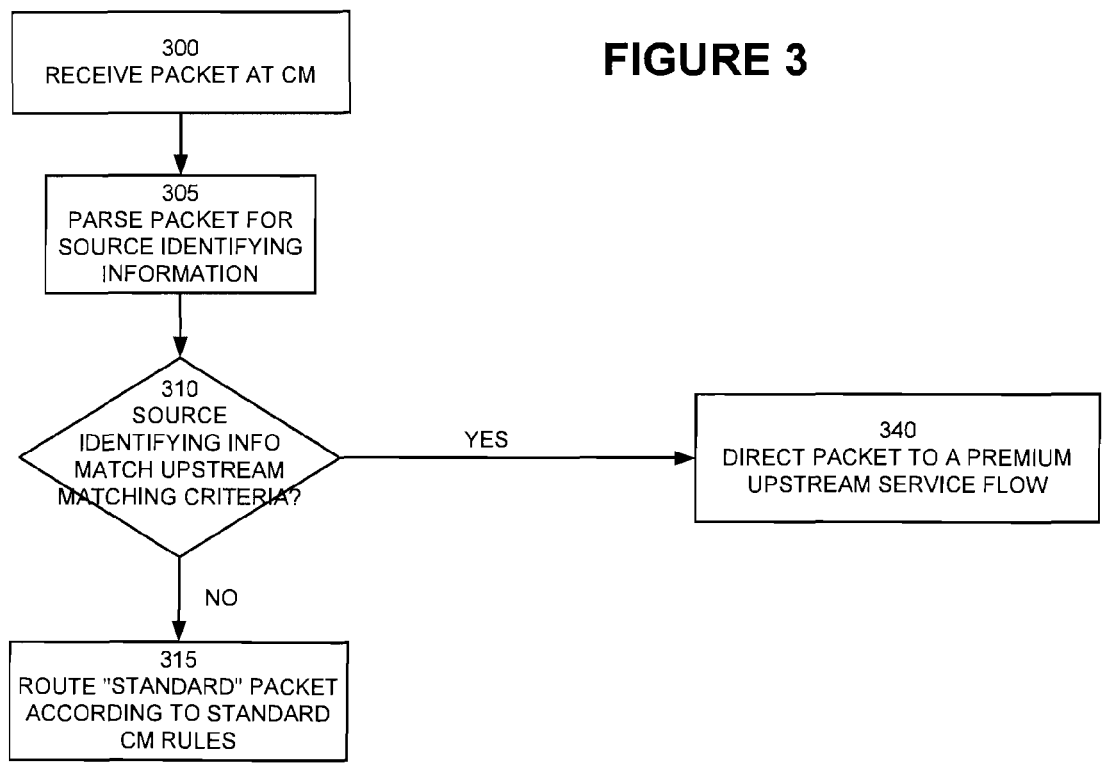
FIG. 3 illustrates a flow diagram of the process by which a packet is identified by a cable modem as a preferred upstream packet and directed upstream using a premium service flow according to embodiments of the present invention.

FIG. 3 illustrates a flow diagram of the process by which a packet is identified by a cable modem as a preferred upstream packet and directed upstream using a premium service flow according to embodiments of the present invention.

A packet is received at a CM 300. The CM parses the packet for destination identifying information 305. The CM then evaluates the destination identifying information to determine whether it matches a premium upstream matching criteria 310. By way of illustration and not as a limitation, premium upstream matching criterion comprises the packet destination IP address, destination port, and ToS bits. As will be appreciated by those skilled in the art, one or more of these criteria may be used in combination to establish the premium upstream matching criteria.

If the destination identifying information does not match the premium upstream matching criteria, the "standard" packet is routed to the destination IP address in accordance with the "standard" rules enforced by the CM 315, including the standard service flow to which it is otherwise entitled.

If the destination identifying information matches the premium upstream matching criteria, the preferred upstream packet is sent to the destination IP address according to a premium upstream service flow associated with the matching criteria 340.

In an embodiment of the present invention, premium transport is offered to content providers for a fee. In this embodiment, a cable network operator agrees to identify downstream packets as originating from a preferred content provider using the systems and methods previously described. A measure of the premium transport usage is captured either at an edge server or at a CMTS. By way of illustration and not as a limitation, the number of packets that are modified to qualify for premium transport are counted and used to determine a usage fee to be charged to the PCP. Alternatively, the time that a premium service flow is used is captured and used for this purpose. As will be appreciated by those skilled in the art, other measures of usage may be employed without departing from the scope of the present invention.

A system and method for providing premium transport in a DOCSIS-compliant cable network have been described. It will be understood by those skilled in the art that the present invention may be embodied in other specific forms without departing from the scope of the invention disclosed and that the examples and embodiments described herein are in all respects illustrative and not restrictive. Those skilled in the art of the present invention will recognize that other embodiments using the concepts described herein are also possible. Further, any reference to claim elements in the singular, for example, using the articles "a," "an," or "the" is not to be construed as limiting the element to the singular.

What is claimed is:

1. A system for providing premium transport over a network comprising:
  a cable modem (CM), a customer premises equipment (CPE), and a cable modem termination system (CMTS), wherein the CPE is connected to the CM and the CM communicates with the CMTS and wherein the CM comprises instructions for:
    receiving upstream service flow parameters from an operator of the network that define a standard upstream service flow;
    receiving preferred content provider (PCP) matching criteria;
    receiving packets from the CPE;
    extracting packet identifying information from a packet IP header of a packet;
    determining if the packet identifying information matches the PCP matching criteria;
    if the packet identifying information matches the PCP matching criteria, then directing the packet to the CMTS over a premium upstream service flow; and
    if the packet identifying information does not match the PCP matching criteria, then directing the packet to the CMTS over the standard upstream service flow.

2. The system of claim 1, wherein the packet identifying information comprises a packet destination IP address.

3. The system of claim 2, wherein the PCP matching criteria comprise a stored source IP address.

4. The system of claim 2, wherein the packet identifying information further comprises a destination port number.

5. The system of claim 4, wherein the PCP matching criteria comprise a stored packet IP address and a stored packet port number.

6. The system of claim 2, wherein the packet identifying information further comprises a type-of-service identifier.

7. The system of claim 6, wherein the PCP matching criteria comprise a stored packet source IP address and a type of service identifier.

8. The system of claim 1, further comprising a preferred packet statistics log configured to:
if the packet identifying information matches the PCP matching criteria, then receive the packet identifying information and billing information.

9. The system of claim 8, wherein billing information comprises the premium service classifier, a packet destination IP address, and a date and time the packet was routed from the CM to the CMTS.

10. The system of claim 9, wherein the PCP matching criteria are associated with a PCP identifier and wherein the billing information further comprises the PCP identifier.

11. The system of claim 1, wherein a PCP is a provider of content selected from the group consisting of games, web pages, video content, audio content, photographic content, news content, packet telephony service, and data content.

12. The system of claim 1, wherein the premium upstream service flow comprises parameters indicative of a maximum upstream burst rate, a traffic priority, and a maximum upstream latency.

13. The system of claim 1, wherein the CM instruction for directing the packet to the CMTS over a premium upstream service flow comprises modifying the packet IP header to receive a premium service classifier indicative of premium transport.

14. A method for providing premium transport over a network comprising:
receiving upstream service flow parameters from an operator of the network that define a standard upstream service flow;
receiving at a cable modem (CM) preferred content provider (PCP) matching criteria;
receiving at the CM packets from a customer premises equipment (CPE);
extracting packet identifying information from a packet IP header of a packet;
determining if the packet identifying information matches the PCP matching criteria;
if the packet identifying information matches the PCP matching criteria, then directing the packet to the CMTS over a premium upstream service flow; and
if the packet identifying information does not match the PCP matching criteria, then directing the packet to the CMTS over the standard upstream service flow.

15. The method of claim 14, wherein the packet identifying information comprises a packet destination IP address.

16. The method of claim 15, wherein the PCP matching criteria comprise a stored destination IP address.

17. The method of claim 15, wherein the packet identifying information further comprises a packet destination port number.

18. The method of claim 17, wherein the PCP matching criteria comprise a stored packet IP address and a stored packet port number.

19. The method of claim 15, wherein the packet identifying information further comprises a packet type-of-service identifier.

20. The method of claim 19, wherein the PCP matching criteria comprise a stored packet IP address and a stored type-of-service identifier.

21. The method of claim 14, wherein the premium upstream service flow comprises parameters indicative of a maximum upstream burst rate, a traffic priority, and a maximum upstream latency.

22. The method of claim 14 further comprising:
if the packet identifying information matches the PCP matching criteria, then sending the packet identifying information and billing information to a preferred packet statistics log.

23. The method of claim 22, wherein sending billing information to the preferred packet statistics log comprises sending the premium service classifier, a packet destination IP address, and a date and time the packet was routed from the CM to the CMTS.

24. The method of claim 23, wherein the PCP matching criteria are associated with a PCP identifier and wherein the billing information further comprises the PCP identifier.

25. The method of claim 14, wherein a PCP is a provider of content selected from the group consisting of games, web pages, video content, audio content, photographic content, news content, packet telephony service, and data content.

26. The method of claim 14, wherein directing the packet to the CMTS over a premium upstream service flow comprises modifying the packet IP header to receive a premium service classifier indicative of premium transport.

27. A method for providing premium transport to a preferred content provider (PCP) over a network comprising:
extracting packet identifying information from an IP header of a downstream packet;
determining if the packet identifying information matches a PCP matching criteria;
if the packet identifying information matches the PCP matching criteria, then modifying the downstream packet IP header to receive a premium service classifier and directing the downstream packet downstream over a premium upstream service flow;
storing a measure indicative of premium transport usage by the PCP;
billing the PCP based on the premium transport usage.

28. The method of claim 27, wherein the packet identifying information comprises a packet source IP address.

29. The method of claim 28, wherein the PCP matching criteria comprise a stored source IP address.

30. The method of claim 28, wherein the packet identifying information further comprises a packet source port number.

31. The method of claim 30, wherein the PCP matching criteria comprise a stored packet IP address and a stored packet port number.

32. The method of claim 28, wherein the packet identifying information further comprises a type-of-service identifier.

33. The method of claim 32, wherein the PCP matching criteria comprise a stored packet IP address and a stored type-of-service identifier.

34. The method of claim 27, wherein determining if the packet identifying information matches a PCP matching criteria is performed at an edge server.

35. The method of claim 27, wherein determining if the packet identifying information matches a PCP matching criteria is performed at a cable modem termination system.

36. The method of claim 27, wherein directing the downstream packet downstream over a premium upstream service flow comprises:
- receiving the downstream packet at a cable modem termination system;
- determining whether the packet IP header comprises the premium service classifier;
- if the packet IP header comprises the premium service classifier, then:
- selecting a downstream premium service flow; and
- directing the downstream packet to a subscriber using the selected premium service flow.

37. The method of claim 36, wherein the premium downstream service flow comprises parameters indicative of a minimum reserved traffic rate, a traffic priority, and a maximum downstream latency.

38. The method of claim 27, wherein the measure indicative of premium transport usage by the PCP comprises packet volume.

39. The method of claim 27, wherein the measure indicative of premium transport usage by the PCP comprises a session time.

40. The method of claim 27, wherein a PCP is a provider of content selected from the group consisting of games, web pages, video content, audio content, photographic content, news content, packet telephony service, and data content.

41. A system for providing premium transport over a network comprising:
- a subscriber access device, a customer premises equipment (CPE), and a network access node,
- wherein the CPE is connected to the subscriber access device and the subscriber access device communicates with the network access node and wherein the subscriber access device comprises instructions for:
  - receiving upstream service flow parameters from an operator of the network that define a standard upstream service flow;
  - receiving preferred content provider (PCP) matching criteria;
  - receiving packets from the CPE;
  - extracting packet identifying information from a packet IP header of a packet;
  - determining if the packet identifying information matches the PCP matching criteria;
  - if the packet identifying information matches the PCP matching criteria, then directing the packet to the network access node over a premium upstream service flow; and
  - if the packet identifying information does not match the PCP matching criteria, then directing the packet to the network access node over the standard upstream service flow.

42. A method for providing premium transport over a network comprising:
- receiving upstream service flow parameters from an operator of the network that define a standard upstream service flow;
- receiving at a subscriber access device preferred content provider (PCP) matching criteria;
- receiving at the subscriber access device packets from a customer premises equipment (CPE);
- extracting packet identifying information from a packet IP header of a packet;
- determining if the packet identifying information matches the PCP matching criteria;
- if the packet identifying information matches the PCP matching criteria, then directing the packet to the network access node over a premium upstream service flow; and
- if the packet identifying information does not match the PCP matching criteria, then directing the packet to the network access node over the standard upstream service flow.

* * * * *